(12) United States Patent
Tosetti et al.

(10) Patent No.: US 8,606,112 B2
(45) Date of Patent: Dec. 10, 2013

(54) PLUGGABLE MODULE WITH BI-DIRECTIONAL HOST-MODULE OPTICAL INTERFACE

(75) Inventors: Carlo Tosetti, Sondrio (IT); Damiano Rossetti, Monza (IT); Carlo Mariotti, Monza (IT); Federico Fontanella, Seregno (IT)

(73) Assignee: Cisco Technology, Inc., San Jose, CA (US)

( * ) Notice: Subject to any disclaimer, the term of this patent is extended or adjusted under 35 U.S.C. 154(b) by 161 days.

(21) Appl. No.: 13/187,626

(22) Filed: Jul. 21, 2011

(65) Prior Publication Data

US 2013/0022359 A1    Jan. 24, 2013

(51) Int. Cl.
*H04B 10/25* (2013.01)
(52) U.S. Cl.
USPC .............................. 398/141; 398/115; 398/66
(58) Field of Classification Search
USPC .............................. 398/66, 43, 212, 116, 141
See application file for complete search history.

(56) References Cited

U.S. PATENT DOCUMENTS

| | | | |
|---|---|---|---|
| 7,090,509 B1 | 8/2006 | Gilliland et al. | |
| 7,255,488 B1 | 8/2007 | Boone et al. | |
| 7,361,053 B1 | 4/2008 | Boone et al. | |
| 7,609,973 B2 | 10/2009 | Rossi et al. | |
| 2009/0154493 A1 | 6/2009 | Hinderthuer | |
| 2009/0154930 A1 | 6/2009 | Hinderthuer | |
| 2009/0154932 A1 | 6/2009 | Hinderthuer | |
| 2009/0162057 A1* | 6/2009 | Friedrich et al. | 398/43 |
| 2010/0158542 A1* | 6/2010 | Steffan et al. | 398/212 |
| 2011/0019998 A1 | 1/2011 | Wong et al. | |

OTHER PUBLICATIONS

Semiconductor Today—Compounds & Advanced Silicon, News, "Avago Unveils Fiber-Optics for Data-Center, Storage, Computing and Consumer Applications," Mar. 9, 2011.
Richard Pitwon et al., Xyratex White Paper, "An Optical Backplane Connection System with Pluggable Active Board Interfaces," Issue 2.0, Oct. 2007.
Ken Hopkins et al., Xyratex White Paper, "Pluggable Optical Backplane Technology," Issue 2.0, Oct. 2007.

* cited by examiner

*Primary Examiner* — Leslie Pascal
(74) *Attorney, Agent, or Firm* — Edell, Shapiro & Finnan, LLC (57) ABSTRACT

An apparatus for connecting a host device to an optical network, and to provide a bi-directional electro-optic interface to the host device. The apparatus comprises at least one optical network port for connection to the optical network, and a transceiver circuit configured to generate optical transmit signals for transmission via the at least one network port. The transceiver circuit is further configured to process optical receive signals received via the network port. The apparatus further comprises an optical connector configured to provide bi-directional transfer of optical data signals with the host device.

25 Claims, 7 Drawing Sheets

PLUGGABLE MODULE WITH BI-DIRECTIONAL HOST-MODULE OPTICAL INTERFACE

TECHNICAL FIELD

The present disclosure relates to a pluggable transceiver module.

BACKGROUND

Fiber-optic or optical networks are used for high-speed connections between two host devices (switches, routers, etc.). Each host device has at least one pluggable module connected thereto that interfaces the electrical domain of the host device with the optical domain of the fiber-optic network. More specifically, pluggable modules are transceivers that convert electrical signals received from the host device into optical transmit signals, i.e., optical domain signals for transmission over fiber-optic cables. Pluggable modules also convert optical receive signals, i.e., optical domain signals received over fiber-optic connectors, into electrical signals usable by the host device.

DESCRIPTION OF EXAMPLE EMBODIMENTS

Overview

An apparatus is provided for connecting a host device to an optical network, and in particular for providing a bi-directional optical connection with the host device. On an optical network side, the apparatus comprises at least one optical network port for connection to the optical network, and a transceiver circuit configured to generate optical transmit signals for transmission via the at least one network port. The apparatus is configured to process optical receive signals received via the network port. On a host device side, the apparatus comprises an electro-optic interface configured to provide bi-directional transfer of high speed optical data signals with the host device through a fiber optic connector. The electro-optic interface includes an electrical connector that provides the pluggable module with low speed connectivity to the host device.

Example Embodiments

Figure 1:
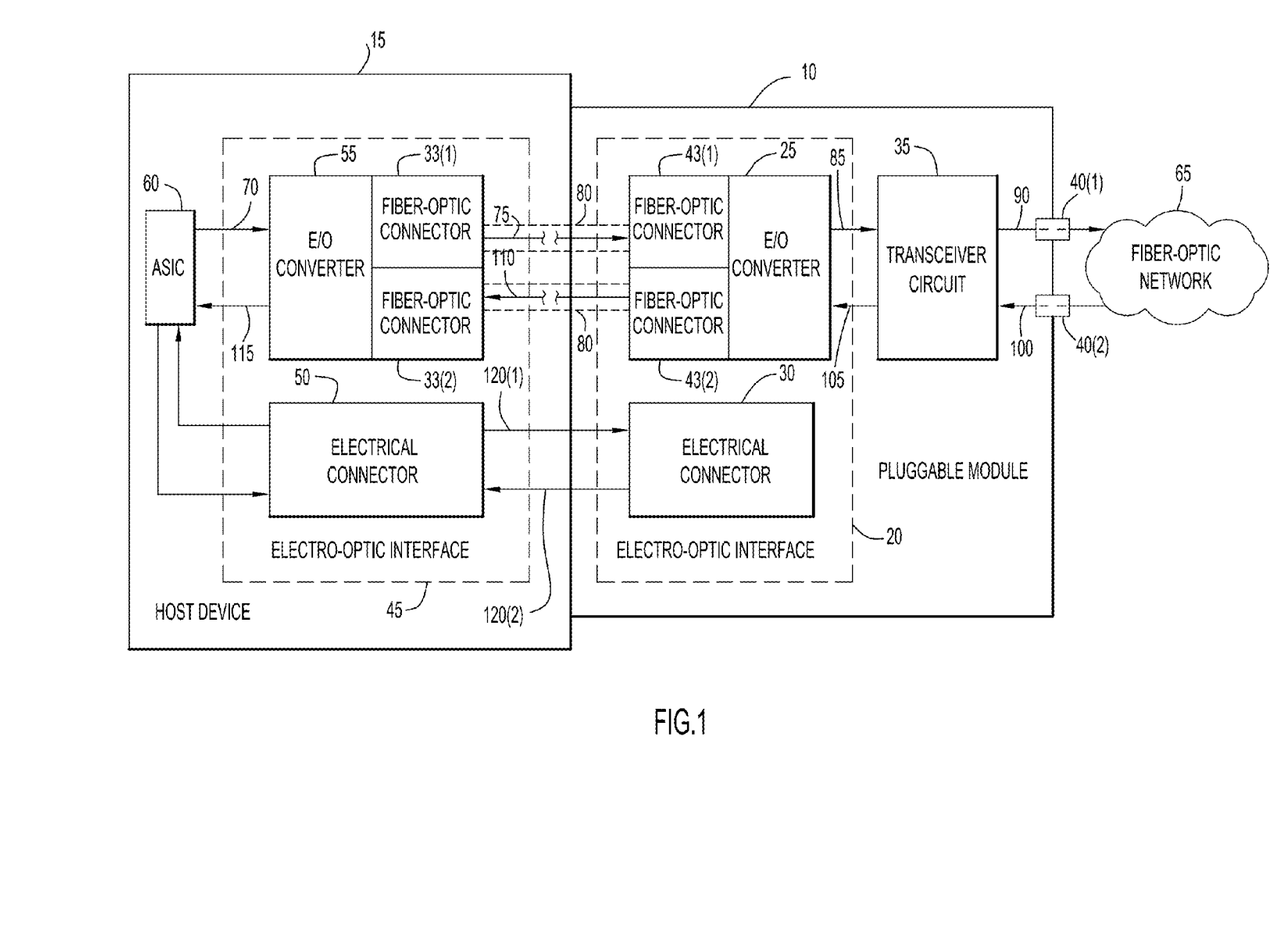
FIG. 1 is a block diagram of a host device and an example of a pluggable module having an electro-optic interface on the host side for bi-directional transfer of optical signals with a host device.

FIG. 1 is a block diagram of a pluggable module 10 connected to a host device 15. Pluggable module 10 comprises an electro-optic interface 20 having a bi-directional electrical-optical (E/O) converter 25, two fiber optic connectors 43(1) and 43(2) and a low speed electrical connector 30. Pluggable module 10 also comprises a transceiver circuit 35, and optical network ports 40(1) and 40(2). Host device 15 comprises an electro-optic interface 45 having an electrical connector 50, a bi-directional E/O converter 55 and two fiber-optic connectors 33(1) and 33(2). Host device 15 also comprises an application-specific integrated circuit (ASIC) 60.

Host device 15 may be, for example, a network switch or a router, and pluggable module 10 serves as an interface for the host device 15 to a fiber optic cable (not shown in FIG. 1) of fiber-optic network 65. In other words, ASIC 60 in host device 15 may generate data for transmission over fiber-optic network 65 via pluggable module 10, as well as utilize data received from the network via the pluggable module, for packet routing, switching and other functions.

The ASIC 60 generates electrical signals 70 containing data for transmission ultimately over fiber-optic network 65. Electrical signals 70 are provided to E/O converter 55 and the E/O converter 55 uses the electrical signals to generate optical data signals 75. E/O converter 55 transmits optical data signals 75 to E/O converter 25 in pluggable module 10 via fiber-optic connector 33(1), one or more optical fiber(s) 80, and fiber-optic connector 43(1). E/O converter 25 converts the optical data signals 75 received from E/O converter 55 into electrical signals 85 for use by transceiver circuit 35. For ease of reference, the electrical signals generated by E/O converter 25 based on received optical data signals 75 are referred to herein as intermediate electrical transmit signals 85. Transceiver circuit 35 uses the intermediate electrical transmit signals 85 to generate optical transmit signals 90 for transmission over fiber-optic network 65 via optical network port 40(1). Further details of E/O converter 25, E/O converter 55, and transceiver circuit 35 are provided below with reference to FIG. 2.

The above description summarizes the generation of data by host device 15, and subsequent transmission of the data over fiber-optic network 65 via pluggable module 10. As noted above, data may also be received by host device 15 from network 65 via pluggable module 10. In such circumstances, optical receive signals 100 are received from network 65 via optical network port 40(2). Transceiver circuit 35 converts the optical receive signals 100 into electrical signals 105 for use by E/O converter 25. The electrical signals generated by transceiver circuit 35 based on received optical signals 100 are referred to herein as intermediate electrical receive signals 105. E/O converter 25 uses the intermediate electrical receive signals 105 to generate optical data signals 110 that are transmitted to E/O converter 55 in host device 15 via fiber-optic connector 43(2), one or more optical fiber(s) 80, and fiber-optic connector 33(2). E/O converter 55 converts the optical data signals 110 received from E/O converter 25 into electrical signals 115 for use by ASIC 60.

In the example of FIG. 1, optical data signals 75 and 110 are transmitted between host device 15 and pluggable module 10. In other words, pluggable module 10 is configured for bi-directional transfer of optical data signals with host device 15. Because one or more optical fiber(s) 80 are used for the high speed transfer of data signals 75 and 110, there is no need for electrical signal lines to transfer the data signals between host device 15 and pluggable module 10. That is, since the data transfer is completely optical, there is no need for expensive, complex and power consuming physical (PHY) layer electrical components on host device 15 for transmission/receipt of electrical signals from pluggable module 10. This overcomes any possible rate limitation imposed by electrical propagation of signals by fully exploiting the greater bandwidth provided by the use of optical fibers. In the example of FIG. 1, low speed electrical connectors 30 and 50 are provided in pluggable module 10 and host device 15, respectively, for the transfer of low-speed electrical signals 120(1) and 120(2) between the pluggable module and the host device. The electrical signals 120(1) and 120(2) may comprise, for example, power signals (i.e., the power supply for operation of pluggable module 10), management or control signals, alarms, etc., but do not include data signals for transmission over network 65, or data signals received from the network. In one form, low speed electrical connectors 30 and 50 may include a two-wire interface (e.g., according to the I²C management interface standard) for management/control of pluggable module 10.

For ease of illustration, FIG. 1 schematically illustrates E/O converter 25 and 55 separate from their respective low speed electrical connectors 30 and 50. It is to be appreciated that such separation is not required for implementation, and that E/O converter 25 may be integrated into one assembly with low speed electrical connector 30 and likewise E/O converter 55 may be integrated into one assembly with low speed electrical connector 50.

FIG. 1 has been described with reference to one or more optical fiber(s) 80 that carry optical data signals 75 and 110 between E/O converter 25 and E/O converter 55. In certain circumstances, optical fiber(s) 80 may be part of any common optical connector (e.g., a Multiple-Fiber (Fibre) Push-On/Pull-off (MTP/MPO) ribbon connector, etc.). Also, as described further below, the length of optical fiber(s) 80 is not important and pluggable module 10 may be positioned a distance away from ASIC 60. It is to be appreciated that the optical pathways provided by fiber-optic connectors 33(1) and 43(1), as well as optical connectors 33(2) and 43(2), are not limited to any specific implementation and may support, for example, serial and/or parallel communications.

Figure 2:
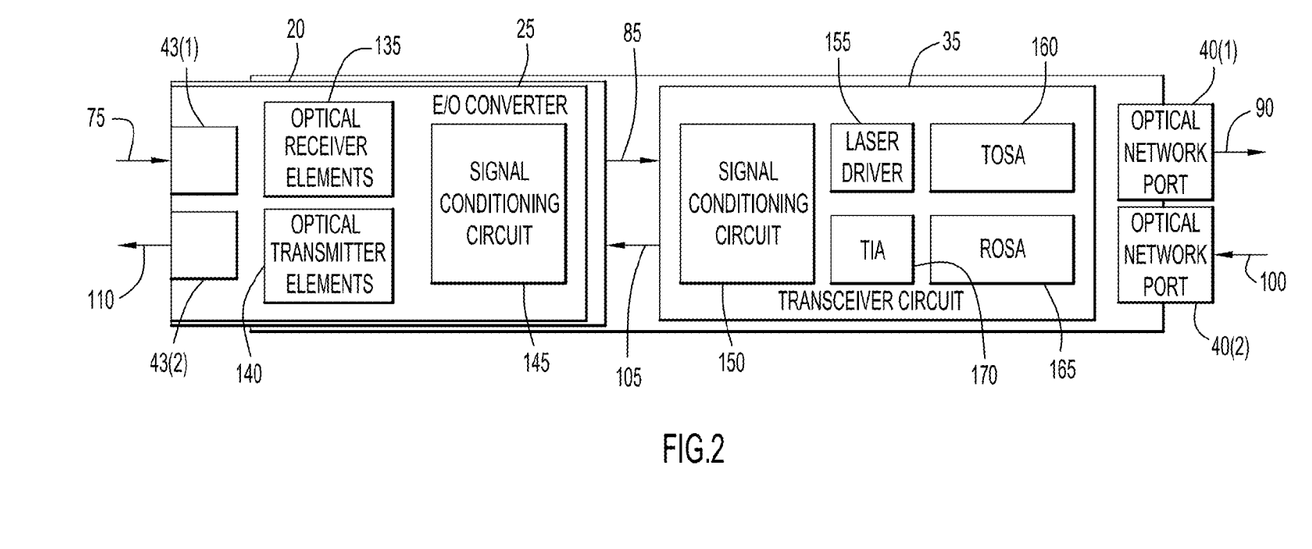
FIG. 2 is a block diagram of one example of the pluggable module having the host-side electro-optic interface.

FIG. 2 is a block diagram illustrating further details of pluggable module 10 of FIG. 1. As previously noted, pluggable module 10 comprises a host-side electro-optic interface 20, transceiver circuit 35, and optical network ports 40(1) and 40(2). Electro-optic interface 20 comprises an E/O converter 25, low speed electrical connector 30 (not shown in FIG. 2), two fiber-optic connectors 43(1) and 43(2), optical receiver elements 135, optical transmitter elements 140, and a signal conditioning circuit 145. Transceiver circuit 35 includes a signal conditioning circuit 150, laser driver 155, a transmitter optical subassembly (TOSA) 160, a receiver optical subassembly (ROSA) 165, and a transimpedance amplifier (TIA) 170. For ease of illustration, the internal connections between elements of E/O converter 25 and transceiver circuit 35 are not shown in FIG. 2.

Optical data signals 75 are received by E/O converter 25 via fiber-optic connector 43(1) and forwarded to optical receiver elements 135. Optical receiver elements 135 convert the received optical signals 75 into intermediate electrical transmit signals 85 for use by transceiver 35. In one example, optical receiver elements 135 comprise a photodiode array, while in another example optical receiver elements 135 comprise one or more discrete photodetectors. Intermediate electrical transmit signals 85 are provided to a signal conditioning circuit 150 that may perform one or more operations (e.g., reconditioning or re-shaping) on signals 85 for further use by laser driver 155. Laser driver 155 generates driver signals for use by, for example, a light-emitting diode (LED), an injection laser diode, etc., in TOSA 160 that generates the optical transmit signals 90 for transmission over network 65 (FIG. 1) via optical network port 40(1).

Optical receive signals 100 may be received by transceiver circuit 35 via optical network port 40(2). More specifically, optical receive signals 100 are received by ROSA 165 and converted to electrical signals. The electrical signals produced by ROSA 165 are then processed by TIA 170. TIA 170 is an electrical device that takes an electric current as an input signal and produces a corresponding voltage as an output signal.

Intermediate electrical receive signals 105 are provided to optical transmitter elements 140 in E/O converter 25 via signal conditioning circuit 145. Signal conditioning circuit 145 uses intermediate electrical receive signals 105 to drive optical transmitter elements 140, thereby generating optical data signals 110 for transmission to host device 15 via fiber optic connector 43(2). In one form, optical transmitter elements 140 comprises a laser in the form of a light-emitting diode (LED), an injection laser diode, etc.

FIG. 2 has been described with reference to a specific implementation of both E/O converter 25 and transceiver circuit 35. It is to be appreciated that these implementations are merely illustrative and other implementations are possible. For example, signal conditioning circuit 150 is shown in FIG. 2 as an element of transceiver circuit 35. It is to be appreciated that this grouping of signal conditioning circuit 150 with transceiver circuit 35 is merely for convenience and does not imply that transceiver circuit 35 necessarily includes such a signal conditioning element.

Additionally, in one form, E/O converter 55 of host device 15 may include the same elements as E/O converter 25, including fiber-optic connectors, optical receiver elements, and optical transmitter elements, and E/O converter 55 may operate in substantially the same manner as E/O converter 25. However, it is to be appreciated that E/O converter 55 may also have other arrangements that facilitate conversion of signals between the optical and electrical domains and subsequent transmission of the converted signals.

Figure 3:
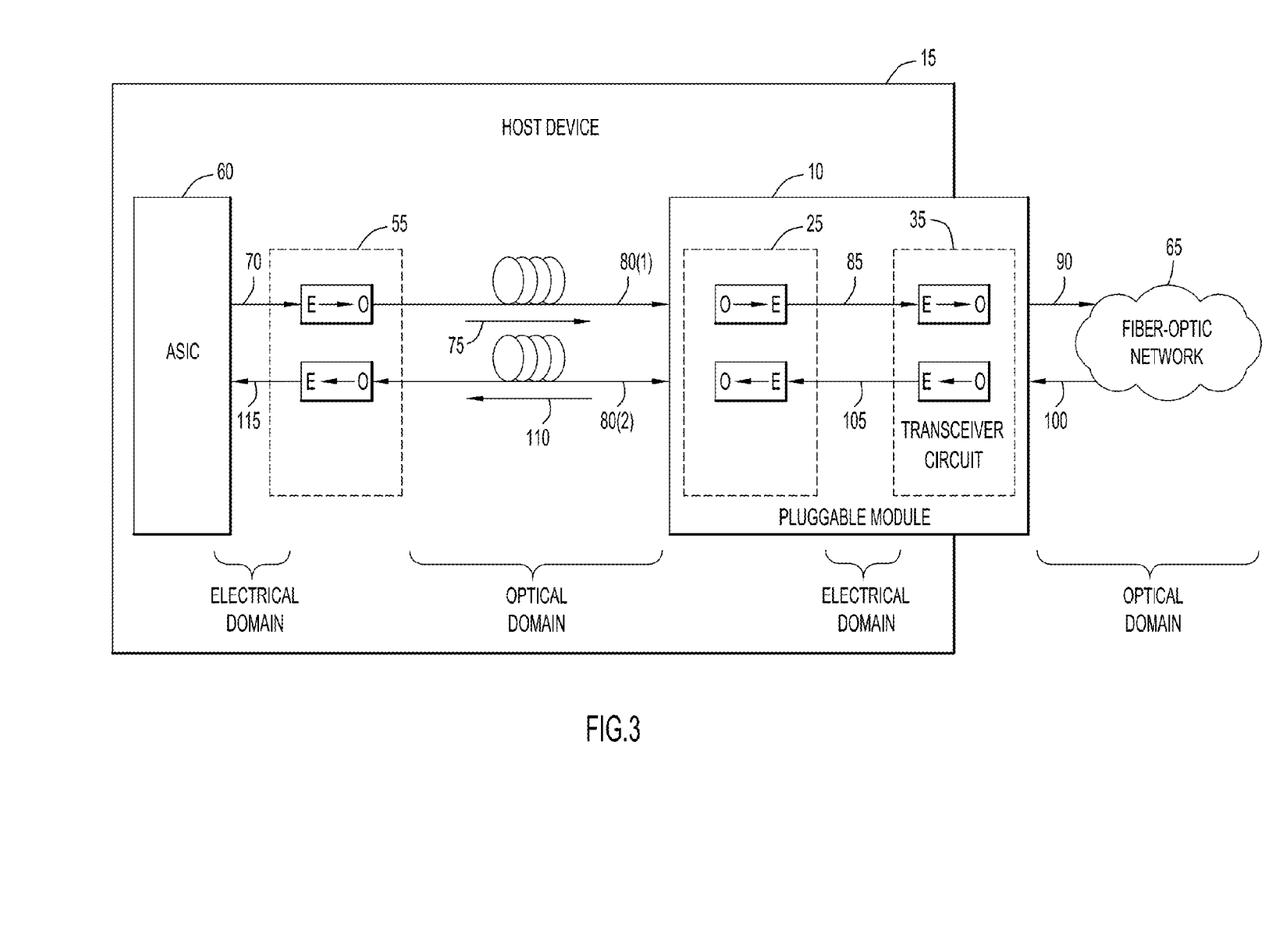
FIG. 3 is a schematic diagram illustrating the bi-directional transfer of signals between the host device and a fiber-optic network via the pluggable module having the host-side electro-optic interface.

The transmission and receipt of data signals by host device 15 via pluggable module 10 includes several different conversions of signals between the electrical and optical domains. FIG. 3 is a diagram schematically illustrating such conversions and the domains of the signals along the pathway between host ASIC 60 and fiber-optic network 65.

As shown in FIG. 3 and as explained above, electrical domain signals 70 are generated by ASIC 60 and provided to E/O converter 55. E/O converter 55 performs electrical-to-optical (E-O) conversion of signals 70 to generate optical domain data signals 75 that are transmitted via an optic-fiber 80(1) to E/O converter 25. E/O converter 25 performs optical-to-electrical (O-E) conversion of data signal 75 to generate electrical domain intermediate electrical transmit signal 85. Transceiver circuit 35 then performs E-O conversion of intermediate electrical transmit signal 85 to generate optical domain signals 90.

Conversely, optical domain signals 100 are received by transceiver circuit 35. Transceiver circuit 35 performs O-E conversion on signals 100 to generate electrical domain intermediate electrical receive signals 105. E/O converter 25 performs E-O conversion of signals 105 to generate optical domain signals 110 for transmission to optical connector 55. Optical connector 55 then performs O-E conversion of signals 110 to generate electrical domain signals 115 for use by ASIC 60.

Figure 4:
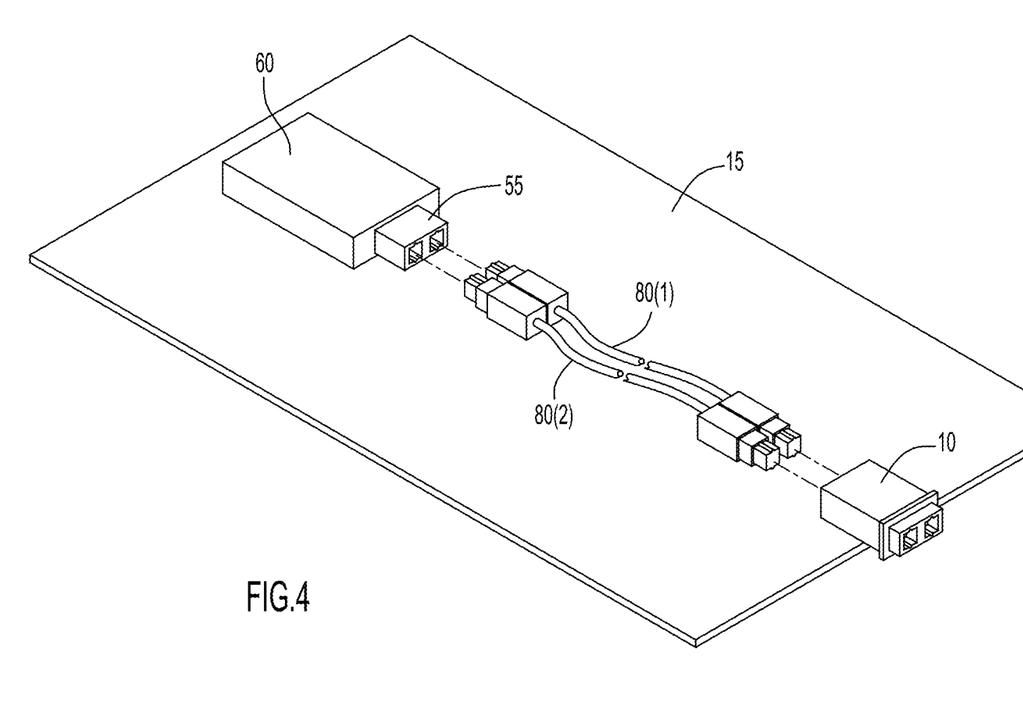
FIG. 4 is a schematic view of a host device and the pluggable module having the host-side electro-optic interface.

FIG. 4 is a perspective view of one example of pluggable module 10 connected to host device 15. In this arrangement, optical data signals 75 and 110 are transferred between E/O converter 25 (not visible in the view of FIG. 4) and E/O converter 55 by first and second fiber-optic cables 80(1) and 80(2) through fiber optic connectors. Specifically, the first optic-fiber cable, cable 80(1) is used for optical data signals 75 transferred from ASIC 60 to pluggable module 10, while the second fiber-optic cable, cable 80(2), is used for optical data signals 110 transferred from pluggable module 10 to ASIC 60.

The length of fiber-optic cables 80(1) and 80(2) is not important and pluggable module 10 may be positioned some distance away from ASIC 60. Specifically, because the high-speed data connection between pluggable module 10 and host ASIC 60 is in the optical domain, and because the transmission of optical signals via an optical fiber does not result in significant signal losses over greater distances, there is no significance in the mutual positioning of ASIC 60 and pluggable module 10. In order words, there are no constraints on distance between the devices. For example, in one implementation it may be possible to position ASIC 60 and pluggable module 10 on different blades because no high speed electrical backplane is required.

The use of optical domain signals for transfer of data between pluggable module 10 and ASIC 60 also provides flexibility in the data rates that are used. In current arrangements, sufficient integrated circuit ("chip") real estate is available for use of a large number of electrical connections that collectively have sufficient speed for high data rate communications. However, it is estimated that available chip real estate will be reduced in future system designs, thereby limiting the number of electrical connections that may be used for data communications. This reduction of chip real estate, coupled with higher data communication speed demands, will limit the ability of electrical connections to support increasingly higher data rates in future networks. An optical connection for transfer of data signals between a host device and a pluggable module is better suited to support higher speed data connections, and not require the chip real estate that may be needed with numerous electrical connections. Also, optical signals have less signal integrity concerns than electrical signals.

Figure 5:
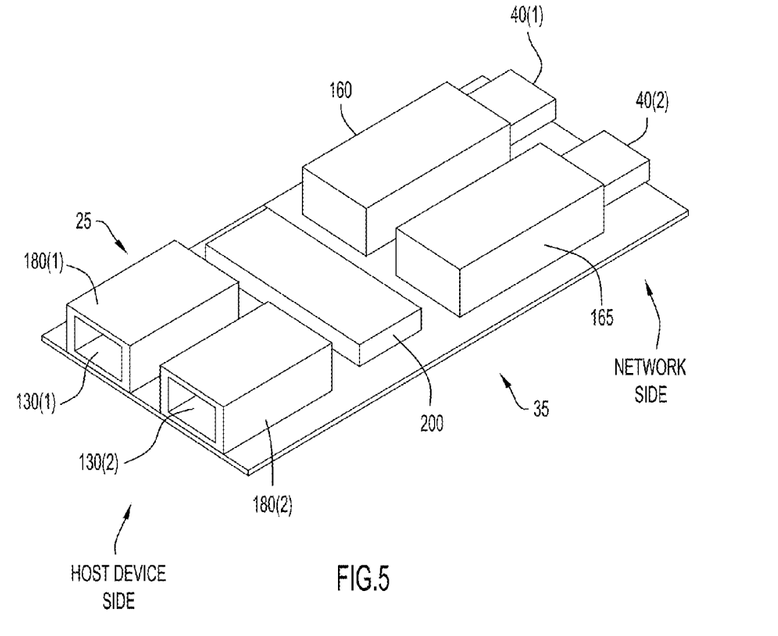
FIG. 5 is a perspective view of the pluggable module having the host-side electro-optic interface.

FIG. 5 is a diagram illustrating one implementation of E/O converter 25 in pluggable module 10. In this arrangement, E/O converter 25 comprises an optical receiver circuit 180(1) and an optical transmitter circuit 180(2). Optical receiver circuit 180(1) receives optical signals from a host device, and converts them to intermediate electrical receive signals for use by transceiver 35. Optical transmitter circuit 180(2) receives intermediate electrical transmit signals from transceiver circuit 35 and converts them to optical data signals for transmission to the host device. Optical receiver circuit 180(1) and optical transmitter circuit 180(2) each comprise a fiber-optic connector 43(1) and 43(2), respectively, for connection to a fiber-optic connector cable. Optical receiver circuit 180(1) also comprises optical receiver elements 135 (not shown in FIG. 5) of E/O converter 25, while optical transmitter circuit 180(2) includes optical transmitter elements 140 (also not shown in FIG. 5) of E/O converter 25.

As shown in FIG. 5, transceiver circuit 35 also comprises TOSA 160, ROSA 165, and a functional module 200 that includes the other elements of transceiver circuit 200, such as a laser driver, TIA and signal conditioning elements.

Figure 6A:
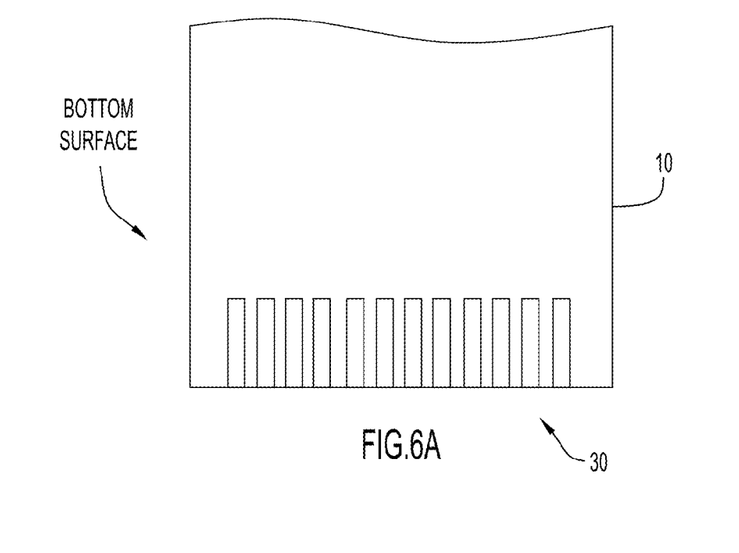
FIGS. 6A and 6B are schematic views of elements of the host-side electro-optic interface on the pluggable module.
Figure 6B:
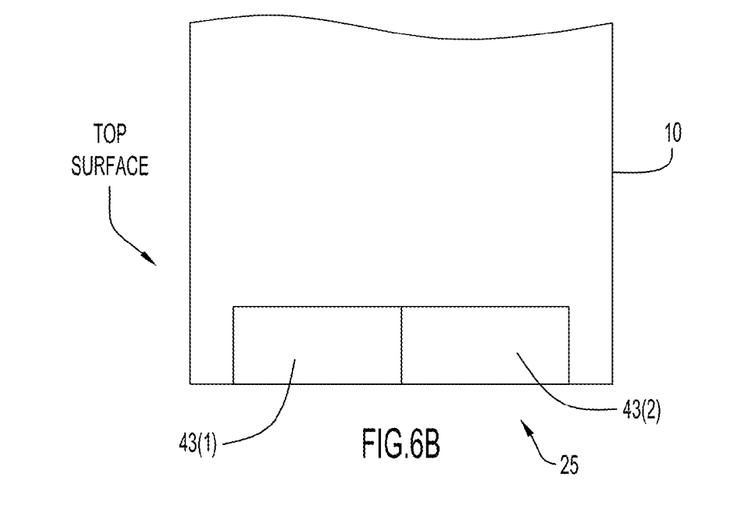

As noted above with reference to FIG. 1, E/O converter 25 and fiber-optic connectors 43(1) and 43(2) on pluggable module 10 are elements or part of an electro-optic interface 20 that also includes a low speed electrical connector 30. FIGS. 6A and 6B illustrate one example arrangement of electro-optic interface 20 in which low speed electrical connector 30 is on the bottom surface of a circuit board in pluggable module 10, while fiber-optic connectors 43(1) and 43 (2) are on the top surface of the board.

Figure 7:
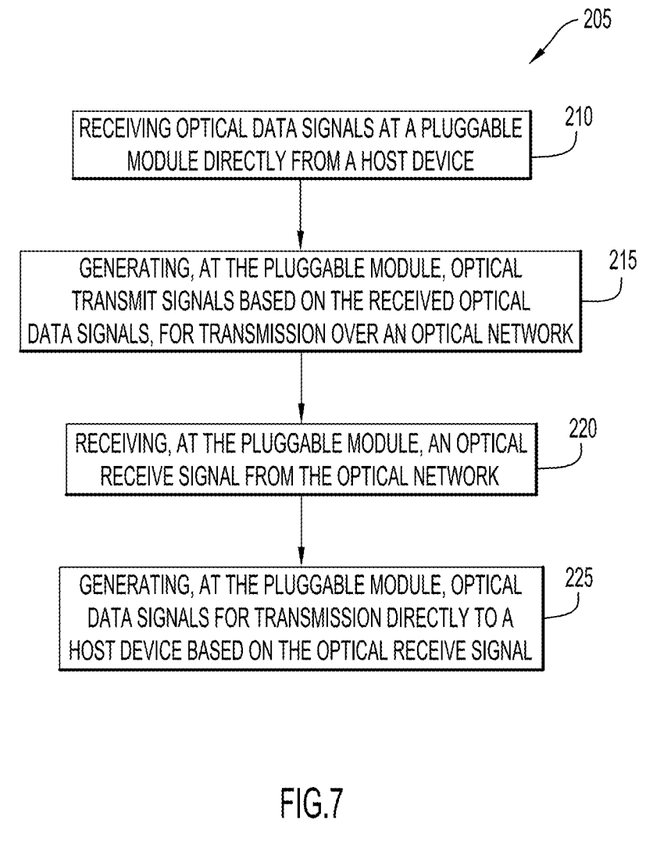
FIG. 7 is a flowchart of a method for bi-directional optical communication between a pluggable module and a host device.

FIG. 7 is a flowchart illustrating an example method 205 for bi-directional optical communication between a pluggable module and a host device. Method 205 begins at 210 where optical data signals are received at a pluggable module directly from a host device. At 215, optical transmit signals are generated at the pluggable module based on the received optical data signals.

At 220, optical receive signals are received, at the pluggable module, from the optical network. Optical receive signals are optical domain signals transmitted via optic-fibers to the module. At 225, the optical receive signals are used by the pluggable module to generate optical data signals for optical transmission to the host device.

The above description is intended by way of example only.

What is claimed is:

1. An apparatus comprising:
    at least one optical network port configured to connect to an optical network;
    a transceiver circuit configured to generate optical transmit signals for transmission via the at least one network port and to process optical receive signals received via the network port; and
    a host-side electro-optic interface configured to receive intermediate electrical receive signals from the transceiver circuit, to generate intermediate electrical transmit signals and supply the same to the transceiver circuit, to connect to an optical portion of an electro-optic interface of a host device via one or more fiber-optic connectors to provide bi-directional transfer of optical data signals with the host device,
    wherein the at least one optical network port, the transceiver circuit, and the host-side electro-optic interface are disposed in a pluggable module.

2. The apparatus of claim 1, wherein the host-side electro-optic interface further comprises:
    an optical receiver circuit configured to convert optical data signals received from the host device into intermediate electrical transmit signals; and
    an optical transmitter circuit configured to convert intermediate electrical receive signals received from the transceiver circuit into optical data signals for transmission to the host device.

3. The apparatus of claim 2, wherein the optical receiver circuit further comprises:
    a photodiode array.

4. The apparatus of claim 2, wherein the optical receiver circuit further comprises:
    one or more discrete photodetectors.

5. The apparatus of claim 2, wherein the optical transmitter circuit further comprises:
    one or more optical transmitter elements.

6. The apparatus of claim 1, wherein the transceiver circuit further comprises:
    a laser; and
    a laser driver configured to drive the laser with the intermediate electrical receive signals.

7. The apparatus of claim 1, wherein the host-side electro-optic interface further comprises:
    an electrical connector configured to provide bi-directional transfer of electrical signals with the host device.

8. The apparatus of claim 1, wherein the host-side electro-optic interface further comprises:
first and second fiber-optic connectors.

9. The apparatus of claim 1 in combination with the host device.

10. A method comprising:
receiving optical data signals, directly from a host device having an electro-optic interface, at a pluggable module having a host-side electro-optic interface; and
generating, at the pluggable module, optical transmit signals based on the received optical data signals, for transmission over an optical network.

11. The method of claim 10, further comprising:
converting, with an optical receiver circuit, the optical data signals received from the host device into intermediate electrical transmit signals; and
driving a laser with the intermediate electrical transmit signals to generate the optical transmit signals for transmission over the optical network.

12. The method of claim 10, further comprising:
receiving, at the pluggable module, optical receive signals from the optical network; and
generating, at the pluggable module, optical data signals for transmission directly to a host device based on the optical receive signal.

13. The method of claim 12, further comprising:
converting the optical receive signals into intermediate electrical receive signals; and
driving a laser with the intermediate electrical receive signals to generate the optical data signals for transmission to the host device.

14. The method of claim 10, further comprising:
receiving one or more electrical signals at the pluggable module directly from the host device.

15. A system comprising:
a host device having a first electro-optic interface; and
a pluggable module comprising:
at least one optical network port configured to connect to an optical network;
a transceiver circuit configured to generate optical transmit signals for transmission via the at least one network port and to process optical receive signals received via the network port; and
a second electro-optic interface configured to receive intermediate electrical receive signals from the transceiver circuit, to generate intermediate electrical transmit signals and supply the same to the transceiver circuit, to connect to an optical portion of the first electro-optic interface of the host device via one or more fiber-optic connectors to provide bi-directional transfer of optical data signals with the host device.

16. The system of claim 15, wherein the second electro-optic interface further comprises:
first and second fiber-optic connectors;
an optical receiver circuit configured to convert optical data signals received from the first electro-optic interface via the first fiber-optic connector into intermediate electrical transmit signals; and
an optical transmitter circuit configured to convert intermediate electrical receive signals received from the transceiver circuit into optical data signals for transmission to the first electro-optic interface via the second fiber-optic connector.

17. The system of claim 16, wherein the optical receiver circuit further comprises:
a photodiode array.

18. The system of claim 16, wherein the optical receiver circuit further comprises:
one or more discrete photodetectors.

19. The system of claim 16, wherein the optical transmitter circuit further comprises:
one or more optical transmitter elements.

20. The system of claim 15, wherein the transceiver circuit further comprises:
a laser; and
a laser driver configured to drive the laser with the intermediate electrical receive signals.

21. The system of claim 15, wherein the pluggable module and the host device each further comprise an electrical connector configured to provide bi-directional transfer of electrical signals between the pluggable module and the host device.

22. An apparatus comprising:
means for receiving optical data signals at a pluggable module directly from an electro-optic interface of a host device; and
means for generating optical transmit signals based on the received optical data signals, for transmission over an optical network.

23. The apparatus of claim 22, further comprising:
means for converting the optical data signals received from the host device into intermediate electrical transmit signals; and
means for driving a laser with the intermediate electrical transmit signals to generate the optical transmit signals for transmission over the optical network.

24. The apparatus of claim 22, further comprising:
means for receiving optical receive signals from the optical network; and
means for generating optical data signals for transmission directly to a host device, via the electro-optic interface, based on the optical receive signal.

25. The apparatus of claim 22, further comprising:
means for receiving one or more electrical signals from the host device.

* * * * *